United States Patent [19]

Witting

[11] 4,196,374

[45] Apr. 1, 1980

[54] COMPACT FLUORESCENT LAMP AND METHOD OF MAKING

[75] Inventor: Harald L. Witting, Burnt Hills, N.Y.

[73] Assignee: General Electric Company, Schenectady, N.Y.

[21] Appl. No.: 969,305

[22] Filed: Dec. 14, 1978

[51] Int. Cl.² ............. H01J 17/34; H01J 61/10; H01J 9/18; H01J 9/38
[52] U.S. Cl. ................................ 315/58; 29/25.13; 316/19; 316/20; 313/204
[58] Field of Search .............. 313/204; 315/58, 62; 29/25.13; 316/18–20

[56] References Cited

U.S. PATENT DOCUMENTS

| | | | |
|---|---|---|---|
| 1,974,888 | 9/1934 | Barclay | 313/204 X |
| 3,024,383 | 3/1962 | Doering | 313/204 |
| 4,095,135 | 6/1978 | Yamazaki et al. | 313/493 |
| 4,117,374 | 9/1978 | Witting | 315/99 |
| 4,147,951 | 4/1979 | Mueller | 313/204 X |

Primary Examiner—Alfred E. Smith
Assistant Examiner—Charles F. Roberts
Attorney, Agent, or Firm—Lawrence D. Cutter; James C. Davis; Marvin Snyder

[57] ABSTRACT

A compact fluorescent lamp comprises a substantially cylindrical, tapered envelope with a correspondingly tapered partition disposed within the envelope so as to define a folded discharge path having a length approximately twice the length of the envelope. The taper of the partition and envelope permit easy assembly of the lamp with minimal disturbance of a prior applied phosphor coating. In accordance with one embodiment of the present invention, the partition is formed using shaping wedges applied to a partially molten glass bulb so as to produce a seamed partition extending almost to the closed end of the bulb. The partition in the lamps of the present invention sealably separate one discharge path portion from another.

16 Claims, 10 Drawing Figures

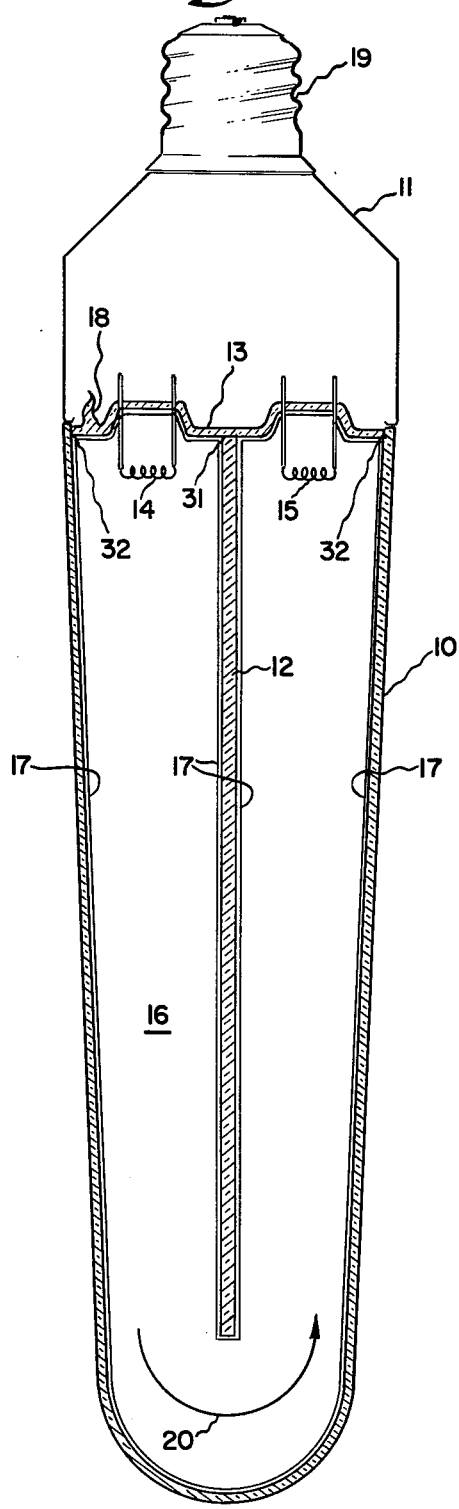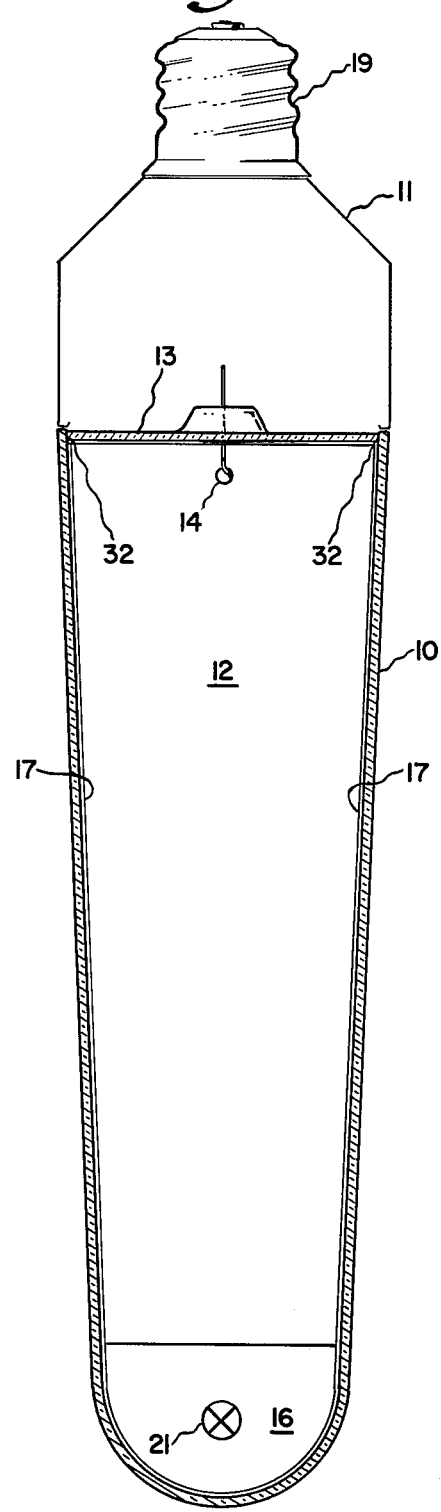

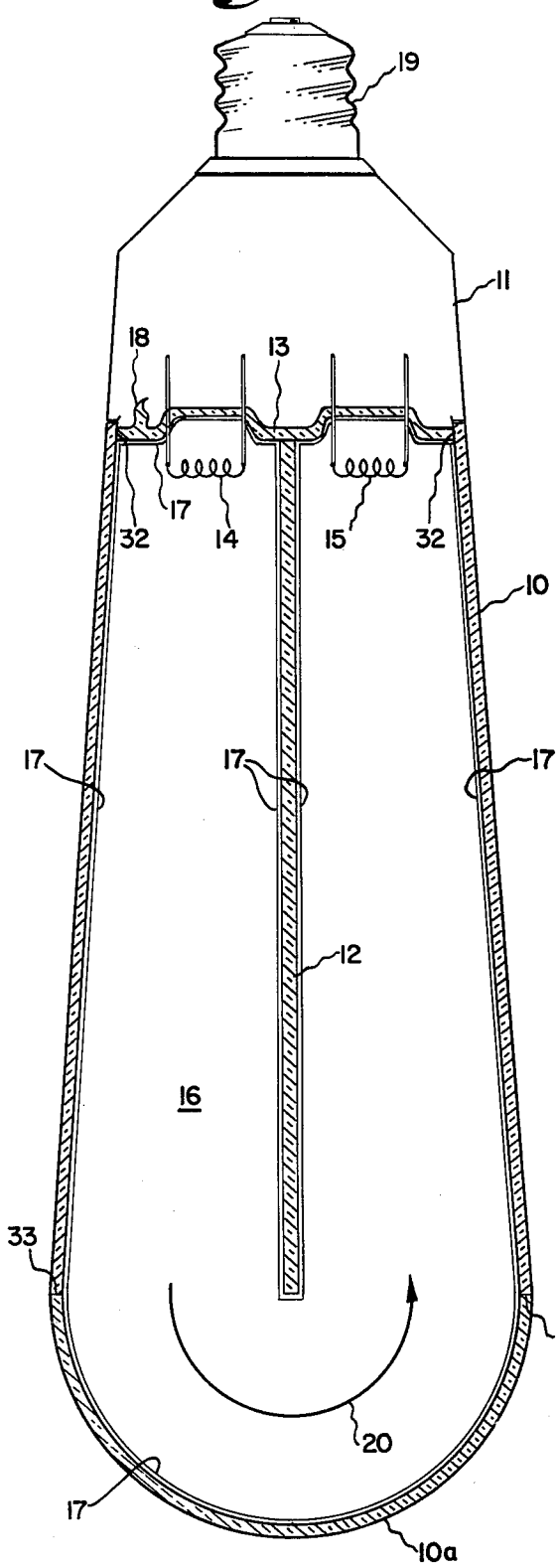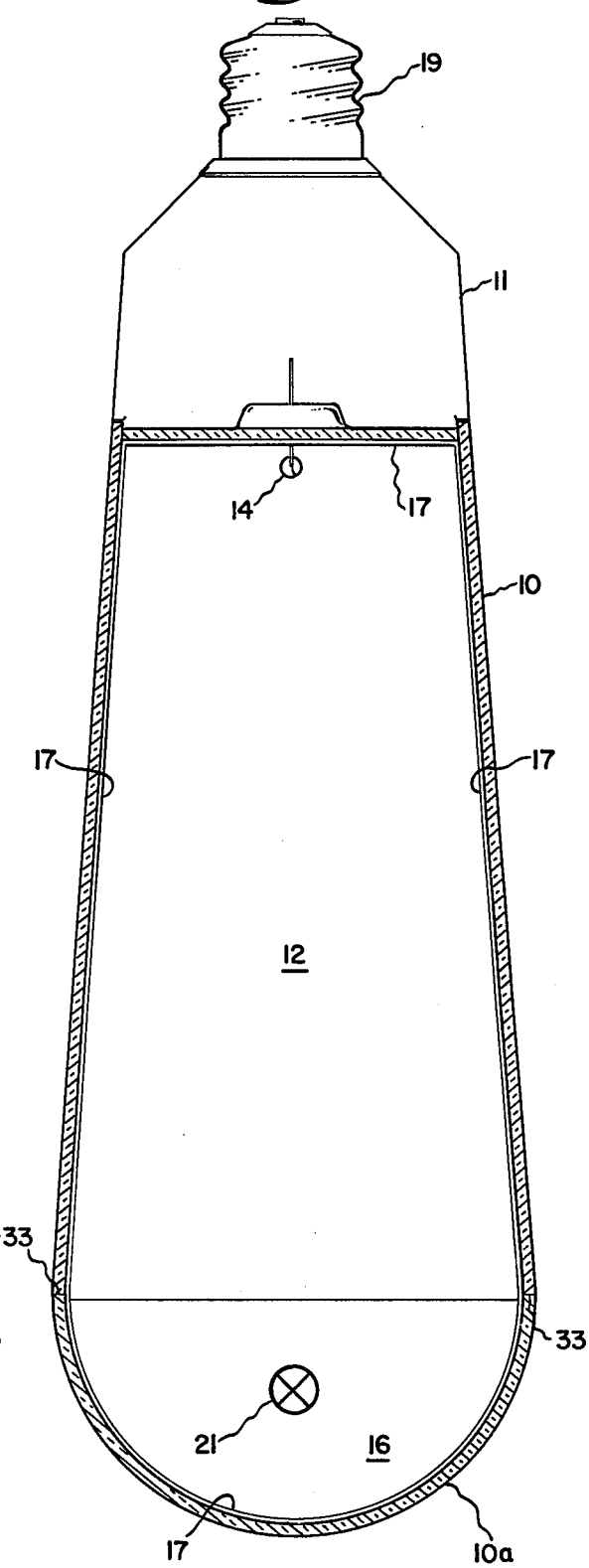

COMPACT FLUORESCENT LAMP AND METHOD OF MAKING

BACKGROUND OF THE INVENTION

This invention relates to fluorescent lamps and in particular, to compact fluorescent lamps having approximately the same dimensions as conventional incandescent lamps.

Because of increasing energy costs and the relative inefficiency of conventional incandescent lamps, typically approximately 15 lumens per watt, there is now a heightened need for more efficient lamps. Fluorescent lamps, typically operating at an efficiency of approximately 70 lumens per watt are therefore more efficient; however, conventional fluorescent lamp configurations do not permit their use in conventional sockets or luminaires designed for the screw-in, Edison base incandescent lamp. Elongated tubular and toroidal fluorescent lamp configurations are incompatible with installation in sockets designed for an incandescent lamp. A compact fluorescent lamp is not manufacturable in a configuration based on either the tubular or the toroidal configuration simply by reducing dimensions because a relatively long arc discharge length is highly desirable. Moreover, a simple shrinking of dimensions, while maintaining appropriate power levels, may result in increased phosphor loading which can significantly decrease the useful life of the lamp through its adverse effects upon the phosphor and also through adverse effects on electrodes employed.

In U.S. Pat. No. 4,095,135 issued June 13, 1978 to Yamazaki et al., there is described a spherical-bulb fluorescent lamp apparently solving some of the aforementioned problems. Yamazaki et al. apparently disclose a fluorescent lamp similar in size and shape to a conventional incandescent lamp and exhibiting a zig-zag discharge path. The discharge path in the aforementioned patent is formed between an outer envelope and an inner envelope, both of which are coated with phosphor material. The inner envelope member possesses ridges and valleys therein so that upon insertion into the outer envelope, certain discharge paths are defined. However, the ridges of the inner envelope do not contact the outer envelope thereby permitting the possibility, depending upon the fill gas and pressure, that one or more of the zig-zag arc paths will be short circuited by a discharge path developing between the outer envelope and a ridge of the inner envelope. The discharge does not occupy the whole volume contained within the outer envelope, but rather is contained in a smaller region relatively adjacent the inner surface of the outer envelope.

SUMMARY OF THE INVENTION

In accordance with a preferred embodiment of the present invention, a compact fluorescent lamp comprises a substantially cylindrical, tapered, evacuable, light-transmissive envelope having an interior phospor coat with a correspondingly tapered partition disposed within the envelope so as to define a two-ended, folded discharge path having a length substantially twice the length of the envelope. Electrode means for initiating and sustaining a discharge current are disposed at each end of the discharge path and a gaseous discharge medium is disposed within the envelope. The partition extends from a base end of the envelope almost to the opposite end so as to define in said opposite end a discharge path opening substantially half-way between the discharge path ends. In one embodiment of the present invention, the envelope is tapered so that it is widest at its base end in which case, the partition member is inserted from said base end. In accordance with another embodiment of the present invention, the envelope is narrowest at its base end and therefore, the partition is inserted from the end opposite its base end which is thereafter sealably capped. Accordingly, methods of manufacturing the compact lamps of this invention are also disclosed herein. In yet another embodiment of this invention, the partition dividing the lamp so as to form two discharge path portions, is formed by pressing a partially molten cylindrical envelope between opposed shaping wedges so as to form a partition extending almost the entire length of the bulb. The bulb is then removed from the glass ribbon from which it was molded and coated with phosphor. The open end of the bulb, now exhibiting a pair of openings, is sealably closed with a corresponding pair of cylindrical glass stems upon which electrodes are mounted.

DESCRIPTION OF THE DRAWINGS

FIG. 1 is a partial cross-sectional side elevation view of a tapered compact fluorescent lamp in accordance with one embodiment of the present invention.

FIG. 2 is a partial cross-sectional side elevation view of the lamp in FIG. 1 rotated 90°.

FIG. 3 is a partial cross-sectional side elevation view of a compact fluorescent lamp similar to the lamp of FIG. 1 except that it is tapered so that the envelope is narrowest at its base end.

FIG. 4 is a partial cross-sectional side elevation view of the lamp of FIG. 3 rotated 90°.

DETAILED DESCRIPTION OF THE INVENTION

Figure 5:
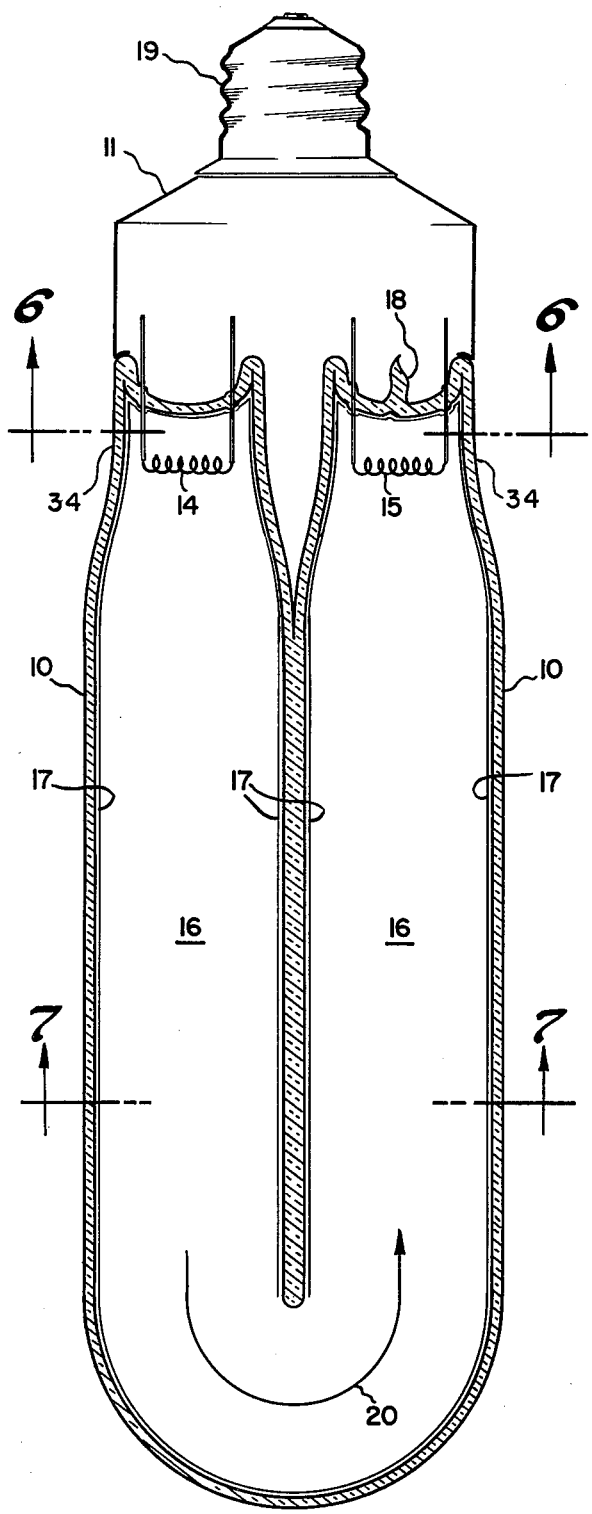
FIG. 5 is a partial cross-sectional side elevation view of a compact fluorescent lamp in which the partition therein is formed by pressing a partially molten glass bulb between shaping wedges.

FIG. 1 illustrates one embodiment of the present invention in which the compact fluorescent lamp is tapered so that the envelope 10 is widest at its base end. Disposed within tapered envelope 10 is correspondingly tapered partition member 12 typically comprising glass or ceramic material. Envelope 10 is preferably glass and transmissive at visible wavelengths. However, partition member 12 need not be light-transmissive. The interior of the envelope 10 is coated with phosphor 17 and preferably, so is partition member 12. The partition member 12 is sealably attached at seal joint 31 to base member 13 which typically comprises a relatively flat glass circular disk with electrodes 14 and 15 disposed therethrough so as to provide initiation and continuation of current through the gaseous discharge medium 16 disposed within the lamp structure. Base member 13 also includes tip-off 18 through which evacuation and back-filling of the lamp may be accomplished. Ballast 11 is attached to the base end of the lamp and acts to couple the electrode means in the base 13 to an alternating current power source through conventional Edison base 19.

FIG. 2 illustrates the same lamp as shown in FIG. 1 except that it is rotated by 90° so as to more completely describe the lamp structure.

The lamp of the present invention is not only a suitable replacement for conventional incandescent lamps, but is also very easy to manufacture. In particular, partition member 12 is typically first attached to base member 13 which already includes a pair of electrodes 14 and 15. The partition 12 is typically attached by flame sealing. Preferably, partition member 12 and the interior portion of the base member 13 are coated with phosphor. The tapered partition 12 is then inserted into correspondingly tapered envelope 10 so as to extend almost to the opposite end thereof but being spaced apart therefrom so as to define a discharge path opening. Partition member 12 is inserted to such an extent that base member 13 abuts against the wider, open end of envelope 10. Base member 13 is then sealably attached to envelope 10 by flame sealing at seal point 32. The lamp is then evacuated through tip-off 18 and back-filled with a gaseous discharge medium typically comprising mercury vapor and an inert gas at a pressure of approximately 2 torr. Ballast 11 is then attached so as to connect electrodes 14 and 15, through said ballast, to an alternating current power supply to which the lamp is connected by conventional Edison base 19. Direction arrows 20 and 21 in FIGS. 1 and 2, respectively, indicate the direction of discharge current flow during one-half cycle of applied alternating current power.

FIGS. 3 and 4 illustrate a compact fluorescent lamp of the present invention having a folded discharge path similar to the lamp illustrated in FIGS. 1 and 2 except that the envelope of the lamp in FIGS. 3 and 4 is tapered so that the narrow end of the envelope is at the base end of the lamp. This latter lamp functions in an identical manner to the lamp in FIGS. 1 and 2; however, its method of manufacture is varied to accommodate the difference in taper direction. In particular, base member 13 is first sealed to the partition member 12. Then, base member 13 and partition member 12 are inserted through the wide, open end of envelope 10 and are sealed to said envelope 10 by flame sealing at sealing point 32. Finally, a dome-shaped cap 10a is sealably mounted at seal point 33 so as to close off the wide end of envelope 10. In the aforementioned method, the envelope 10, base member 13, partition 12, and cap 10a are preferentially coated with phosphor prior to assembly. As above, direction arrows 20 in FIGS. 3 and 21 in FIG. 4 indicate the direction of discharge flow during a single half-cycle of applied alternating current power. Likewise, ballast 11 and base member 19 are thereafter attached at the base end of the envelope so as to provide suitable coupling to an alternating current power source through the same Edison base socket means as conventional incandescent lamps.

Accordingly, the lamps illustrated in FIGS. 1-4 are easy to manufacture and said lamps eliminate two significant problems associated with fluorescent lamps having a folded U-shape discharge path. In particular, the tapering of the envelope and the partition significantly mitigate problems associated with close tolerance requirements needed to avoid discharge current short circuit paths along various joints. Additionally, the lamp of the present invention is easy to uniformly coat with phosphor since it is preferentially coated therewith prior to assembly.

For example, a lamp made in accordance with the present invention having an envelope approximately 6 inches in length and approximately 2½ inches in diameter exhibits an arc length of approximately 10 inches and an arc cross-sectional area equivalent to 1½ inch diameter circle. Such a lamp, using a high percentage of neon as an inert component of the gaseous discharge medium, and fitted with inverse cone electrodes such as those described in U.S. Pat. No. 4,117,374 issued Sept. 26, 1978 to the inventor herein and assigned to the same assignee as this invention, is comparable to a 10½ inch long, short arc fluorescent lamp with Powergroove ® envelope and produces approximately 1,900 lumens with a power input of approximately 40 watts. The lamp of the present invention however, is much shorter and has the further advantage of being inherently single-ended and fairly easy to coat with phosphor.

Figure 6:
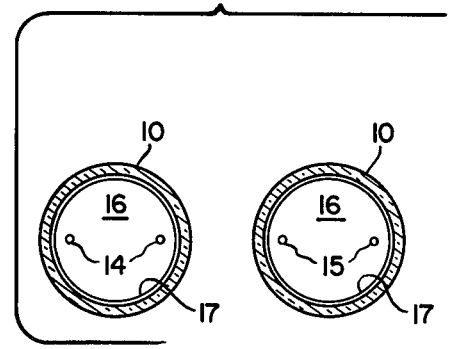
FIG. 6 is a cross-sectional view through a portion of FIG. 5 as shown.
Figure 7:
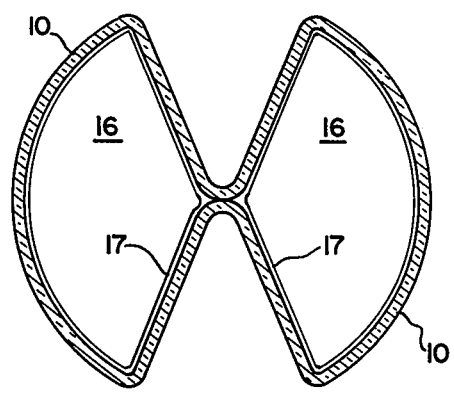
FIG. 7 is a cross-sectional view through FIG. 5 as shown.
Figure 8:
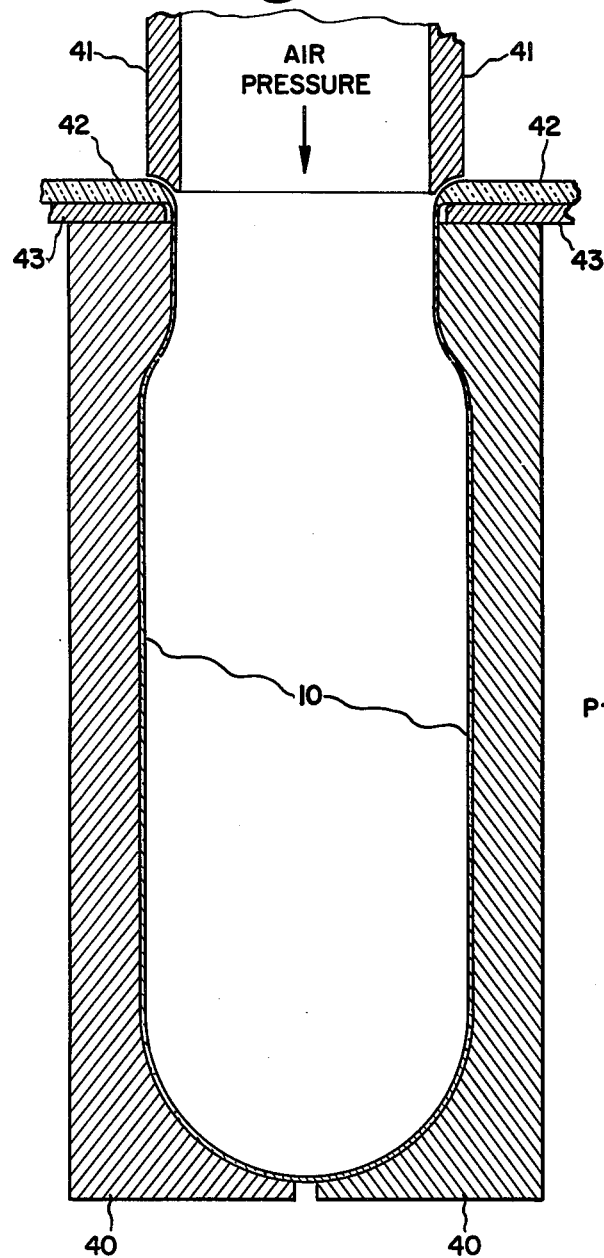
FIG. 8 is a cross-sectional side elevation view illustrating the molding of a cylindrical glass envelope.
Figure 9:
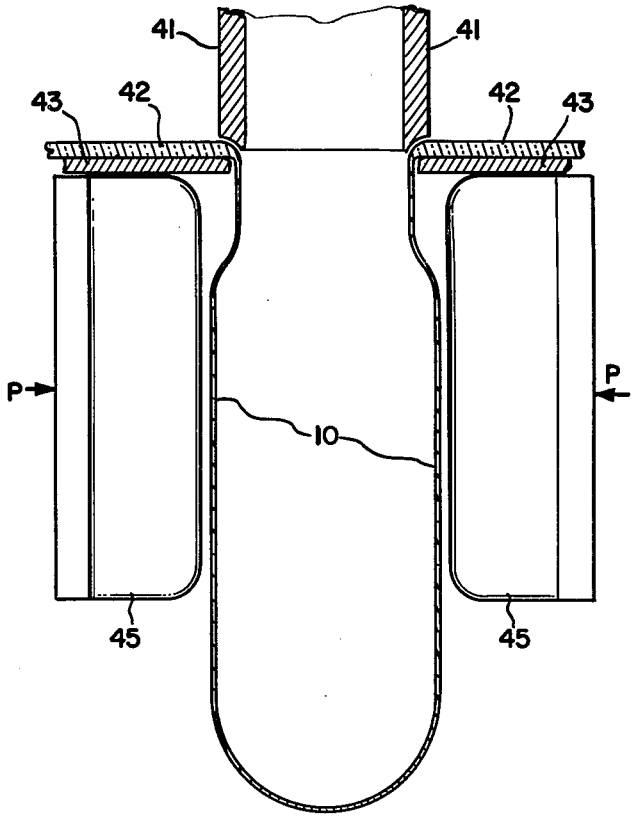
FIG. 9 is a partial cross-sectional side elevation view of the glass envelope in FIG. 8 illustrating the operation of the shaping wedges.
Figure 10:
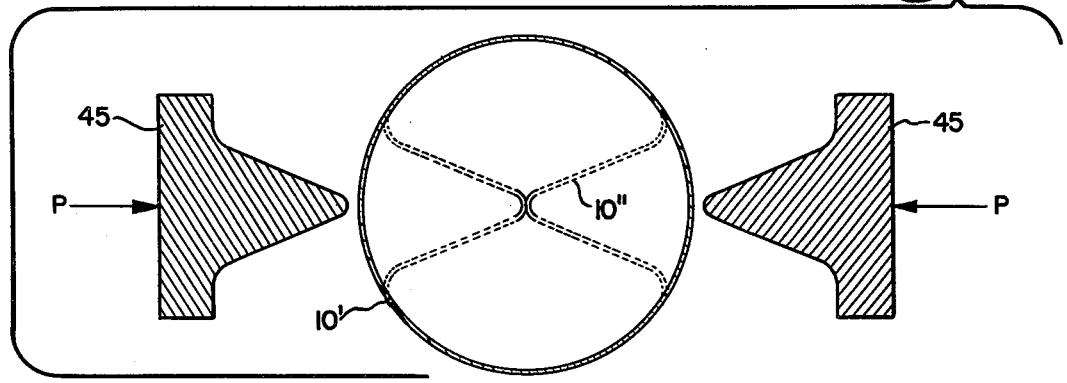
FIG. 10 is cross-sectional elevation view illustrating the effect of the shaping wedges on the glass envelope.

In addition to placement of a partition in a compact fluorescent lamp as shown in FIGS. 1-4, the partition may also be provided by pressing a portion of a partially molten cylindrical glass bulb between a pair of shaping wedges so as to squeeze together opposing sides thereof forming a partition extending from an open end of the bulb almost to a closed end. Such a lamp is illustrated in FIG. 5 with corresponding sectional views shown in FIGS. 6 and 7. The manufacture of such a lamp is illustrated in FIGS. 8-10. In particular, a substantially cylindrical light-transmissive envelope typically comprising glass is blown on a ribbon machine from a layer of molten glass 42 with air pressure being supplied through cylindrical tube 41 as the glass layer 42 passes over an opening in supporting sheet 43. The air pressure forces the glass into mold 40 to achieve its substantially cylindrical shape. Mold 40 is typically a split, rotating steel mold as conventionally employed. While the glass is still partially molten the mold 40 is removed and shaping wedges 45 press against the envelope 10, as shown in FIG. 9. Pressure is applied to the shaping wedges until opposite sides of partially molten glass envelope 10 meet so as to form a seamed partition within the envelope. To avoid premature glass hardening, shaping wedges 45 are preferably heated. The shaping wedges 45 do not extend for the entire length of the cylindrical envelope 10, but rather are sized longitudinally only to partition a major portion of the envelope. Thus, there is provided a discharge path opening at the end of the envelope distal from the base of the lamp. FIG. 10 illustrates the action of the shaping wedges 45 on the shape of the envelope, and particularly shows envelope 10' prior to pressing and envelope 10" subsequent to pressing.

Subsequent to the pressing step, the shaped bulb is then removed from the glass ribbon and coated with phosphor. At this stage of manufacture, the lamp envelope exhibits a pair of openings at one end, its base end. To these openings, substantially cylindrical glass stems are flame sealed to the envelope at sealing point 34 (FIG. 5). One or both of these cylindrical glass stems includes a tip-off 18 through which the lamp may be evacuated and back-filled with a gaseous discharge medium. A ballast 11 and Edison base 19 are provided as above in the lamps of FIGS. 1-14. The resulting cross section of the lamp (FIG. 7) is highly favorable for the escape of visible wavelength radiation of phosphor, so that a reflective coating is not necessary. It is further noted that the partition seam of the lamp of FIG. 5 is preferably pressed wide and thin in the base end of the lamp and this portion may later be removed, so as to provide a better fit for the cylindrical stems containing the electrodes 14 and 15.

From the above, it may be appreciated that the embodiments of the compact fluorescent lamps of the present invention provide a novel, easily manufacturable lamp structure exhibiting a high degree of efficiency and configured to replace the conventional, less efficient incandescent lamp. The lamps of the present invention do not require a high degree of dimensional tolerance in their component parts. Neither are the lamps of the present invention susceptible to short circuiting of the discharge current through gaps in the partition or between the partition and the envelope wall. Additionally, the lamps of the present invention are very easily coated with phosphor and moreover exhibit a plasma discharge substantially throughout their entire volume.

While this invention has been described with reference to particular embodiments and examples, other modifications and variations will occur to those skilled in the art in view of the above teachings. Accordingly, it should be understood that the appended claims are intended to cover all such modifications and variations that fall within the true spirit of the invention.

The invention claimed is:

1. A compact fluorescent lamp comprising:
   a substantially cylindrical, tapered, evacuable, light-transmissive envelope having an interior phosphor coat, said envelope having a base end;
   a gaseous discharge medium disposed within said envelope;
   tapered partition means disposed within said envelope, said taper being matched to the taper of said envelope, so as to define a two-ended discharge path having a length substantially twice the length of said envelope; and
   electrode means for initiating and sustaining a discharge current, said means being disposed at each end of said discharge path.

2. The lamp of claim 1 in which said envelope taper and said partition taper are such that the envelope is widest at its base end.

3. The lamp of claim 1 in which said envelope taper and said partition taper are such that the envelope is narrowest at its base end.

4. The lamp of claim 1 further comprising ballast means coupled to said electrode means and disposed at the base end of said envelope for coupling into Edison base sockets.

5. A method of manufacturing a compact fluorescent lamp comprising the steps of:
   coating the interior of a tapered, evacuable, light-transmissive cylindrical envelope opened at the wide end thereof, with phosphor;
   attaching a correspondingly tapered partition to a base member including a pair of electrodes, so as to dispose one electrode on each side of said partition, said base member possessing a tip-off and being sized so as to closeably seal against said wide, open end of said cylinder;
   inserting said partition member into said envelope so that said partition protrudes almost to the narrow end of said envelope and so that said base abuts the wide end of said envelope;
   sealing said base to said envelope;
   evacuating and back-filling said envelope through said tip-off.

6. The method of claim 5 in which said tapered partition is coated with phosphor.

7. The method of claim 5 further comprising the step of:
   attaching a ballast to said lamp adjacent its base member, said base coupling said electrodes to a power source through an Edison base.

8. The lamp in accordance with the method of claim 5.

9. A method of manufacturing a compact fluorescent lamp comprising the steps of:
   coating the interior of a tapered, evacuable, light-transmissive cylindrical envelope, open at both ends, with phosphor;
   attaching a correspondingly tapered partition at its narrower end to a base member including a pair of electrodes, so as to dispose one electrode on each side of said partition, said base member possessing a tip-off;
   inserting said base member and partition into said envelope through its wide end so that the wide end of said partition aligns with the wide end of said envelope and so that said base abuts the narrow end of said envelope;
   sealing said base to said envelope;
   sealably attaching a cap to close said envelope at its wide end; evacuating and back-filling said envelope through said tip-off.

10. The method of claim 9 in which said partition is coated with phosphor.

11. The method of claim 9 further comprising the step of:
   attaching a ballast to said lamp adjacent its base member, said ballast coupling said cathodes to a power source through an Edison base.

12. The lamp made in accordance with the method of claim 9.

13. A method of manufacturing a compact fluorescent lamp comprising the steps of:
   molding from a molten glass ribbon, a cylindrical glass bulb, open at one end and closed at the other end;
   pressing a portion of said bulb while still partially molten between a pair of shaping wedges so as to squeeze together opposing sides thereof to form a partition therein extending from the open end of said bulb almost to the closed end thereof;
   separating said bulb from said ribbon;
   coating said bulb with an interior phosphor coat;
   sealably attaching a pair of cylindrical glass stems, each stem possessing an electrode and at least one of which possessing a tip-off, to the pair of openings formed in said open end by said partition, so as said electrodes are disposed on opposite sides of said partition;
   evacuating and back-filling said envelope through at least one tip-off.

14. The method of claim 13 further comprising the step of:
   attaching a ballast to said lamp at its base end, said ballast coupling said electrodes to a power source through an Edison base.

15. The method of claim 13 in which said shaping wedges are heated.

16. The lamp in accordance with the process of claim 13.

* * * * *